March 15, 1966     J. D. KIRSCHMANN     3,240,401
FLOW REGULATOR FOR A MATERIAL DISTRIBUTOR
Filed May 2, 1962
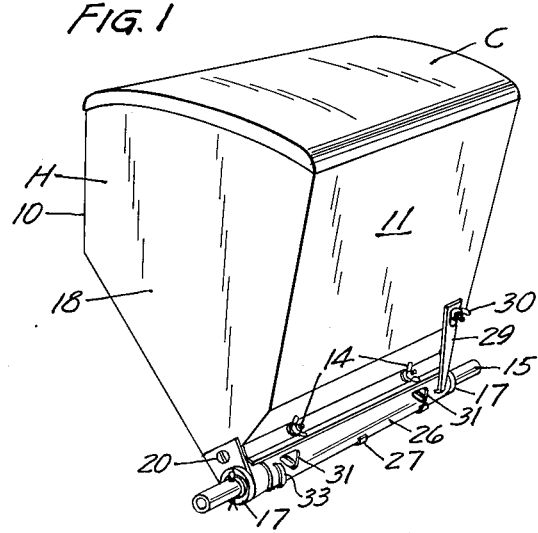
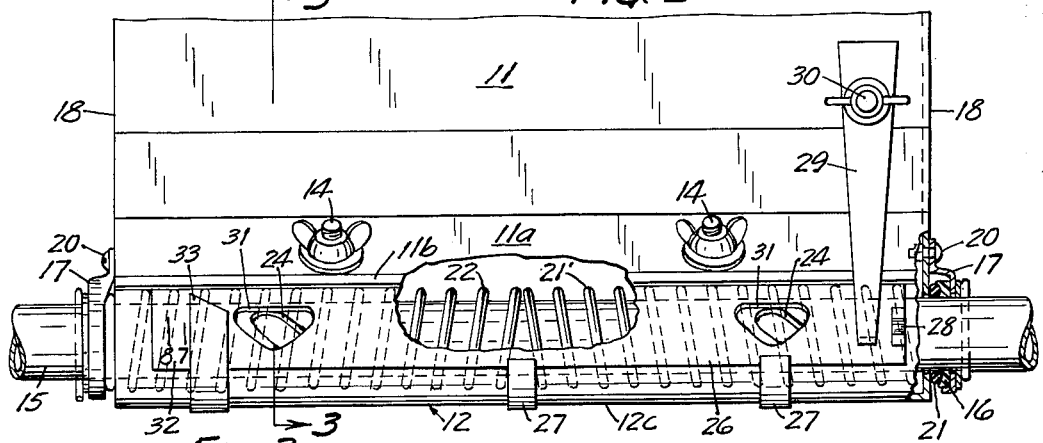
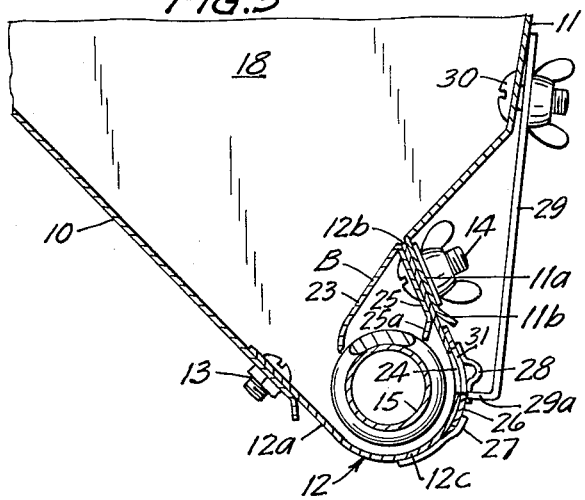
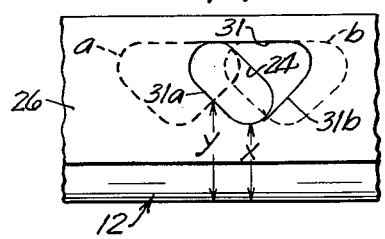
INVENTOR
JOHN D. KIRSCHMANN
BY Williamson + Palmatier
ATTORNEYS

United States Patent Office 3,240,401
Patented Mar. 15, 1966

3,240,401
FLOW REGULATOR FOR A MATERIAL
DISTRIBUTOR
John D. Kirschmann, 209 W. Owen Ave.,
Bismarck, N. Dak.
Filed May 2, 1962, Ser. No. 191,917
11 Claims. (Cl. 222—311)

This invention relates to granular material distributors and more particularly to novel improved means for controlling the flow of material dispensed or distributed.

The type of material distributor with which this invention is concerned is that type in which the granular material is dispensed from suitable hopper structure through one or more small openings therein, and is particularly concerned with a type of distributor such as disclosed in my prior U.S. Patent 2,804,998 in which the granular material is discharged from one or more openings in a trough located at the bottom of the hopper and in which the discharge openings are located above the bottom of the trough and the flow of material discharged therethrough is controlled and regulated by suitable feed mechanism, preferably of the spiral auger variety. In granular material distributors of this type, it is important that the material be uniformly dispensed and in addition it is important that the rate of flow be carefully regulated in order to meet the particular conditions. The rate and character of flow of material from distributors of this type depends in large part upon the size and shape of the material itself and upon the size and shape of the opening through which it is discharged and the height of said opening above the bottom of the trough. It is frequently desirable to vary the rate of feed of any given material. Also, it is frequently desirable to use a single distributor for dispensing different types of granular material which vary in size, shape and nature.

Therefore, it is an important object of this invention to provide novel improved means for accurately controlling the flow of material through said discharge openings and carefully controlling the rate at which granular material is dispensed therethrough.

Another object is to provide novel means for varying the height, size and shape of said discharge openings to regulate the rate of flow of material therethrough.

These and other objects and advantages of my invention will more fully appear from the following description made in connection with the accompanying drawings wherein like reference characters refer to the same or similar parts throughout the several views, and in which:

FIG. 1 is a perspective view of one preferred embodiment of this invention;

FIG. 2 is a partial rear elevational view of the distributor of FIG. 1 on an enlarged scale with portions thereof broken away;

FIG. 3 is a cross sectional view taken along the lines 3—3 of FIG. 2; and

FIG. 4 is a detailed view illustrating the manner in which the height, size and shape of the discharge openings is regulated.

Reference is now made to the accompanying drawings for a more detailed description of this invention.

The form of the invention shown in the accompanying drawings includes a hopper H having a closure or cover C therefor. The hopper has inwardly and downwardly converging lower front and back wall portions 10 and 11 respectively, the lower ends of which are spaced apart both vertically and horizontally for receiving and removably mounting therebetween an elongate dished trough 12 which extends the full width of the hopper and is disposed transversely of the direction of travel. The front wall 12a of the trough is detachably secured to the front wall 10 of the hopper by means of suitable fasteners 13, the front wall 12a providing a continuation for the front wall 10 of the hopper and inclining downwardly and rearwardly therefrom. The back wall 12b of the trough is detachably secured to the downwardly and rearwardly inclined offset portion 11a of the rear wall 11 of the hopper by means of a suitable fastener such as the bolt and wing nut assemblies 14. The front and back wall portions 12a and 12b of the trough are interconnected and the trough completed by a curved or semi-circular portion 12c.

A feed auger is rotatably mounted and disposed longitudinally within the trough and includes an auger shaft 15 which is journalled in suitable bearings 16 which are disposed outside the ends of the trough and held in place by suitable clamping straps or brackets 17 which are secured to the side walls 18 of the hopper by means of suitable fasteners 20. Suitable rubber O-rings 21 are provided between the bearings and the side wall of the hopper to seal the interior of the trough from the outside atmosphere. The auger shaft 15 has mounted thereon spiral auger means such as the helically wound springs 22 and 21'.

Interior baffle structure B is provided which overlies the auger throughout the entire length thereof and is secured to the back wall of the hopper by means of the aforementioned bolt and wing nut assembly 14. The baffle member includes a portion 23 which provides an extension of the rear wall 11 of the hopper and extends downwardly and forwardly over the auger unit and terminates in spaced relation to the front of the trough and cooperates therewith to provide a narrow opening or throat for feeding the material from the hopper generally tangentially downwardly of the front side of the auger which in turn carries the material under the auger and across the curved portion 12c and generally axially of the trough to the discharge openings 24 formed in the trough. The baffle portion 23, by completely overlying the top of the auger, shields the top and back side of the auger from any down pouring material and the auger is thereby able to work more efficiently to deliver a steady uniform stream of material to the discharge openings.

The baffle member B also includes a depending portion 25 which is suitably apertured to receive the fastening assemblies 14, said depending portion 25 terminating in a lower free end portion 25a which is offset forwardly to hold back excessive upward material movement past and above and beyond the discharge openings 24, and to prevent the material from overflowing or riding up on the top of the auger from the back side thereof to materially add to the efficiency of the auger and the feed mechanism.

The discharge openings 24 are provided in the rear face of the trough adjacent the point of juncture between the back wall and lower curved portion thereof, with the lowermost edge of the discharge openings being located above the lowermost part of the trough and the lowermost part of the auger. This construction insures an even feed of material since there is at all times an accumulation in the trough up to the level of the discharge openings. Furthermore, this arrangement prevents the material from flowing out of the discharge openings when the distributor is not in operation, the rotation of the auger being necessary to move and convey the granular material from the hopper to and through the discharge openings.

The hopper may be mounted on any suitable mobile supporting means and the auger may be driven by any suitable means, neither the mobile supporting means nor the means for driving the auger being shown since they do not form a part of this invention per se and are not necessary to a complete understanding of this invention. However, my prior aforementioned patent illustrates one means of mounting the hopper and driving the auger, the auger in the device of said patent being driven by the traction wheels through suitable connection therewith.

It will also be understood that the distributor of this invention can be used to dispense any type of granular material desired.

To control the flow of material through the discharge openings 24, an elongate control plate 26 is provided which is slidably mounted on the outer face of the rear wall of the trough and is adapted for sliding movement longitudinally of said trough. To achieve the slidable mounting of the plate 26, the lower marginal edge portion 11b of the rear wall of the hopper is offset and inclined outwardly from the wall portion 11a so as to provide a space between it and the back wall of the trough for receiving therebetween the upper marginal edge portion of the plate 26. Plate retaining elements 27 are mounted on the lower outside portion of the trough, the upper ends of said elements being in spaced relationship to said trough so as to receive the lower marginal edge portion of the cover plate 26 therebetween. Thus, to mount the plate 26 on the trough, it is simply positioned in parallel relationship to the trough and inserted from either end of the trough underneath the offset portion 11b and the retaining elements 27 and slide longitudinally of the trough into the position desired. A handle 28 is mounted on the plate 26 to facilitate the mounting, adjusting movement, and removal of the control plate. To retain the plate in the position desired, a spring clamp 29 is provided, the upper end of which is releasably secured to the back wall of the hopper by means of the wing nut and bolt assembly 30. The spring clamp has an inwardly directed foot 29a which bears against and frictionally engaged the control plate 26 to hold the plate in place, the spring clamp being released or tightened by respective loosening or tightening of the nut and bolt assembly 30.

The control plate 26 is provided with flow regulating openings or apertures 31 which are longitudinally spaced from each other the same distance as the longitudinal spacing between the discharge openings 24 in the trough whereby the openings 31 cooperate simultaneously with their respective openings 24 in the trough in the same identical fashion so that any adjustment of the control plate effects a simultaneous adjustment of each cooperating pair of openings 24 and 31.

In order to regulate the flow of material being dispensed through the discharge openings, the shape of the openings 24 and 31 are preferably so designed for cooperation with each other that longitudinal movement of the plate in either direction simultaneously effects a change in the effective height, size and shape of the openings through which the material is being discharged, which changes enable the flow of material to be adjusted, varied and regulated to meet any situation.

In the preferred embodiment illustrated in the accompanying drawings, the discharge openings 24 are elongate slots having rounded end portions, said slots being diagonally disposed with respect to the longitudinal or horizontal and transverse or vertical axes of the trough and the plate 26, with the sides of the slots being parallel to each other. The openings 31 in the cover plate are triangular in shape with the apexes thereof being rounded to substantially the same curvature as the rounded end portions of the slots 24. The vertical height of the openings 31 is at least as great as the vertical height of the slots 24. One side 31a of the openings 31 is parallel to the sides of the slot 24 while the opposite side 31b thereof is angularly offset at substantially right angles to the side 31a and the sides of the slot 24.

Thus, when the openings 24 and 31 are in the relative solid line positions shown in FIG. 4, the slotted opening 24 is completely open with the lowermost portion of the opening being at the lowest or minimum height possible with respect to the bottom of the trough, said minimum height being indicated by the reference letter x. By sliding the control plate 26 to the left as viewed in FIG. 4, the side 31b of the opening 31 is moved to the left and progressively covers more and more of the slot 24. In so doing, the size of the opening through which the material passes is progressively reduced, the shape thereof is changed, and the lowermost edge thereof is progressively raised with respect to the bottom of the trough, thereby reducing the rate of flow therethrough, it being understood that the rate of flow is dependent upon and controlled in part by the height of the opening above the bottom of the trough.

Thus, when the plate has been moved to the left so that the opening 31 assumes the broken line position a in FIG. 4, the length and size of the slot 24 has been reduced by about half and the bottom edge of the opening through which the material is discharged has been raised substantially to a higher elevation y. By sliding the plate 26 to the right as viewed in FIG. 4 from the solid line position shown in FIG. 4, the side 31a remains parallel to the sides of the slot 24 but progressively covers more and more of the slot with continued movement to the right. Thus, when the plate has been shifted to the right to a degree whereby the opening 31 assumes the broken line position b shown in FIG. 4, the width of the slot 24 has been reduced by about half while the length thereof remains about the same.

Thus, in the arrangement shown, the side 31a always remains parallel to the sides of the slot 24 and the side 31b maintains its offset angular relationship with respect to the sides of the slot 24 so as to be able to intersect same and reduce the size and increase the height of of the discharge opening. It will be understood that the invention is not limited to the precise shape and size of the openings 24 and 31 shown in the drawings, and that the invention includes within its scope openings of any size and shape which will achieve the variation in size, shape and height of the discharge opening in the manner contemplated by this invention.

In order to facilitate the obtaining of a desired adjustment of the plate 26 and the openings 31 thereof with respect to the discharge openings 24 of the trough, suitable indicia 32 may be provided upon the plate 26, which indicia may be used in conjunction with an indicator 33 mounted on the bottom portion of the trough and extending upwardly therefrom. The indicator 33 shown is in spaced relationship with respect to the trough whereby the plate 26 can be received therebetween and whereby the indicator can also function as a means for retaining the plate on the trough.

Thus, in use, the hopper is filled with granular material and the plate 26 is adjusted to the setting most desirable for the type of material to be dispensed and the rate of flow desired. Upon turning of the auger, the material is carried by the auger thereunder and across the lower curved portion of the trough and also longitudinally thereof to the discharge openings 24 where the material is discharged therethrough.

If desired, any suitable spout or conveying structure may be mounted on or used with the distributor shown and described to control the conveyance and distribution of the material once it has been fed through the discharge openings.

It will, of course, be understood that various changes may be made in the form, details, arrangement and proportions of the various parts without departing from the scope of my invention.

It will also be understood that the invention is not limited to the use of a control plate having the same number of regulating openings as discharge openings in the trough, and includes within its scope control plate means for using some of the discharge openings while closing off others, so that any number of openings between one and the maximum provided may be utilized as desired. Thus, for example, several control plates may be provided for use interchangeably on the same device. In the form shown, a second control plate may be provided having a single regulating opening therein adapted for registration with one of the discharge openings shown, the second plate being adapted to cover completely the other discharge opening to prevent escape of material therefrom. Also, another form of control plate may be provided having more regulating openings than discharge openings and arranged in staggered fashion thereon whereby certain discharge openings can be opened and others closed by simply shifting the position of the plate on the trough.

What I claim is:

1. A granular material distributor comprising a hopper having an elongate trough at its lower portion, a discharge opening in said trough and disposed above the bottom thereof, mechanism in said trough for conveying material in said trough to said discharge opening, and means for regulating the flow of material through said discharge opening, said means including a plate mounted on said trough for movement relative thereto, said plate having a regulating opening formed therein adapted for variable cooperative registration with said discharge opening to vary the effective size and height of said discharge opening above the bottom of the trough in response to the movement of said plate, one of said openings comprising an elongate slot offset from both the horizontal and vertical, the other of said openings having a side adapted to simultaneously intersect both sides of said slot and simultaneously vary the effective size and height of the opening in said trough when moved relative to said sides of said slot while intersecting both of them.

2. The distributor of claim 1, wherein said side of said other opening is substantially normal to the sides of said slot.

3. The distributor of claim 1, wherein said other opening includes another side which is substantially parallel to the sides of said slot.

4. The distributor of claim 3, wherein said sides of said other opening are substantially normal to each other.

5. A granular material distributor comprising a hopper having an elongate trough at its lower portion, a discharge opening in said trough and disposed above the bottom thereof, mechanism in said trough for conveying material in said trough to said discharge opening, and means for regulating the flow of material through said discharge opening, said means including a plate mounted on said trough for movement longitudinally thereof, said plate having a regulating opening formed therein adapted for cooperative registration with said discharge opening and adapted to vary the effective size and height of said discharge opening above the bottom of said trough upon movement thereof relative to said discharge opening in response to movement of said plate longitudinally of said trough, one of said openings being an elongate slot angularly offset from the longitudinal axis of said trough, the other of said openings having a side angularly offset from the longitudinal axis of said trough and adapted to simultaneously intersect both sides of said slot at an angle thereto.

6. A granular material distributor comprising a hopper having an elongate trough at its lower portion, a discharge opening in said trough and disposed above the bottom thereof, mechanism in said trough for conveying material in said trough to said discharge opening, and means for regulating the flow of material through said discharge opening, said means including a plate mounted on said trough for movement longitudinally thereof, said plate having a regulating opening formed therein adapted for cooperative registration with said discharge opening and adapted to vary the effective size and height of said discharge opening above the bottom of said trough upon movement thereof relative to said discharge opening in response to movement of said plate longitudinally of said trough, one of said openings being an elongate slot angularly offset from the longitudinal axis of said trough, the other of said openings having converging sides, one of which is parallel to the sides of said slot, the other of which is angularly offset therefrom and adapted to simultaneously intersect the sides of said slot at an angle thereto.

7. The distributor of claim 6, wherein said regulating opening is of a size whereby in at least one position it completely circumscribes said discharge opening and said discharge opening is completely open.

8. A granular material distributor comprising a hopper having an elongate trough at its lower portion, a discharge opening in said trough disposed above the bottom thereof, mechanism in said trough for conveying material in said trough to said discharge opening, and means for regulating the flow of material through said discharge opening, said means including a plate mounted on said trough for movement longitudinally thereof, said plate having a regulating opening formed therein adapted for cooperative registration with said discharge opening, one of said openings comprising an elongate slot with parallel sides angularly offset from the longitudinal axis of the trough, the other of said openings having downwardly converging intersecting sides disposed at substantially right angles to each other, with one of said converging sides being substantially parallel to the sides of said elongate slot, the apex formed by said converging sides being substantially co-extensive with the lower limit of said slot, the vertical distance between the top and bottom limits of said other opening being at least as great as the vertical distance between the top and bottom limits of said slot, said regulating opening being adapted to vary the effective size and height of said discharge opening above the bottom of said trough upon movement thereof relative to said discharge opening in response to movement of said plate longitudinally of said trough.

9. The distributor of claim 8, wherein the maximum width of the slot measured longitudinally of the trough is less than the maximum width of the other opening measured longitudinally of the trough.

10. A granular material distributor comprising a hopper having an elongate trough at its lower portion, a discharge opening in said trough, spiral auger mechanism mounted in said trough with the axis of rotation extending longitudinally of said trough, said auger mechanism being adapted to convey material in said trough to said discharge opening, the lower limit of said discharge opening being disposed above the bottom of said trough and intermediate the top and bottom limits of said auger mechanism, said auger being in spaced relation with respect to the sides and bottom of said trough, and means for regulating the flow of material through said discharge opening, said means including a plate mounted on said trough for movement longitudinally thereof, said plate having a regulating opening formed therein adapted for cooperative registration with said discharge opening, and adapted to vary the effective size and height of said discharge opening above the bottom of said trough upon movement thereof relative to said discharge opening in response to movement of said plate longitudinally of said trough.

11. A granular material distributor comprising a hopper having an elongate trough at its lower portion, a discharge opening in said trough disposed above the bottom thereof, mechanism in said trough for conveying material in said trough to said discharge opening, and means for regulating the flow of material through said discharge opening, said means including a plate mounted on said trough for movement longitudinally thereof, said plate having a regulating opening formed therein adapted for cooperative registration with said discharge opening and adapted to vary the effective size and height of said discharge opening above the bottom of said trough upon movement thereof relative to said discharge opening and response to movement of said plate longitudinally of said trough, one of said openings comprising an elongate slot with parallel sides angularly offset from the longitudinal axis of said trough, the ends of said slots terminating in rounded end portions, the other of said openings being triangularly shaped with the apexes thereof rounded to substantially the same curvature as the ends of said slot, one apex of said triangular opening being oriented directly downwardly, the sides defining said downwardly directed apex being at substantially right angles to each other with one of the sides being parallel to the sides of said slot, the upper and lower limits of said openings being substantially co-extensive with each other, the maximum width of the slot measured longitudinally of the trough being less than the maximum width of the triangular opening measured longitudinally of the trough.

References Cited by the Examiner
UNITED STATES PATENTS

| | | | |
|---|---|---|---|
| 1,888,821 | 11/1932 | Fearn | 222—177 X |
| 2,634,029 | 4/1953 | Juzwiak | 222—561 X |
| 2,792,970 | 5/1957 | Gaiman | 222—177 X |
| 2,819,826 | 1/1958 | Kirschmann | 222—177 X |
| 2,916,189 | 12/1959 | Christenson | 222—561 X |

LOUIS J. DEMBO, *Primary Examiner.*

RAPHAEL M. LUPO, *Examiner.*